(12) United States Patent
Yokoyama et al.

(10) Patent No.: US 9,170,767 B2
(45) Date of Patent: Oct. 27, 2015

(54) INFORMATION STORAGE MEDIUM, TERMINAL DEVICE, DISPLAY SYSTEM, AND IMAGE GENERATING METHOD

(75) Inventors: Issei Yokoyama, Matsumoto (JP); Tomohiro Nomizo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 638 days.

(21) Appl. No.: 13/192,582

(22) Filed: Jul. 28, 2011

(65) Prior Publication Data

US 2012/0030594 A1    Feb. 2, 2012

(30) Foreign Application Priority Data

Jul. 29, 2010  (JP) ................................ 2010-170620

(51) Int. Cl.
*G06F 3/048*  (2013.01)
*G06F 3/14*  (2006.01)
*G06F 3/0484*  (2013.01)

(52) U.S. Cl.
CPC .......... *G06F 3/1454* (2013.01); *G06F 3/04847* (2013.01); *G06F 2203/04803* (2013.01); *G09G 2340/04* (2013.01)

(58) Field of Classification Search
CPC .................. G06F 3/04847; G06F 2203/04803; G06G 2340/04
USPC ......... 715/765, 735, 744, 783, 792, 798, 803, 715/805, 825
See application file for complete search history.

(56) References Cited

U.S. PATENT DOCUMENTS

| | | | | |
|---|---|---|---|---|
| 5,404,442 A | * | 4/1995 | Foster et al. | ................... 715/769 |
| 5,413,345 A | * | 5/1995 | Nauck | ........................... 473/156 |
| 6,028,603 A | * | 2/2000 | Wang et al. | ................... 715/776 |
| 6,246,411 B1 | * | 6/2001 | Strauss | ......................... 715/863 |
| 6,734,859 B2 | * | 5/2004 | Hayashi et al. | ............... 345/475 |
| 6,822,663 B2 | * | 11/2004 | Wang et al. | ................... 715/854 |
| 7,065,710 B2 | * | 6/2006 | Hayashi et al. | ............... 715/732 |
| 7,177,045 B2 | * | 2/2007 | Goel et al. | ................... 358/1.18 |
| 7,460,140 B2 | * | 12/2008 | Hayashi et al. | ............... 345/698 |

(Continued)

FOREIGN PATENT DOCUMENTS

| | | |
|---|---|---|
| JP | 2001-024826 A | 1/2001 |
| JP | 2004-54783 A | 2/2004 |

(Continued)

OTHER PUBLICATIONS bing search q=configuration%20change%20image%20t May 30, 2015.*

(Continued)

*Primary Examiner* — Boris Pesin
*Assistant Examiner* — John Heffington
(74) *Attorney, Agent, or Firm* — ALG Intellectual Property, LLC

(57) ABSTRACT

A terminal device includes: an image generating unit generates a configuration change image used for changing a configuration of an entire image displayed by a display device which includes an individual image on the basis of image information supplied from one or more terminal devices; and an input unit to which operation information representing an operation relating to a change in the configuration is input. The configuration change image represents an arrangement of the individual image in the entire image and includes an individual-image arranging area divided into a plurality of display target areas and an icon arranging area including the icon of each of the terminal devices.

12 Claims, 12 Drawing Sheets

(56) References Cited

U.S. PATENT DOCUMENTS

| | | | |
|---|---|---|---|
| 7,565,618 B2* | 7/2009 | Sheasby et al. | 715/769 |
| 7,894,688 B2* | 2/2011 | Barbieri | 382/276 |
| 7,995,090 B2* | 8/2011 | Liu et al. | 348/14.01 |
| 8,099,416 B2* | 1/2012 | Qiu et al. | 707/741 |
| 8,200,508 B2* | 6/2012 | Fujita et al. | 705/3 |
| 8,274,534 B2* | 9/2012 | Montague | 345/661 |
| 8,370,762 B2* | 2/2013 | Abbott | 715/769 |
| 8,448,091 B2* | 5/2013 | Tanaka | 715/835 |
| 8,510,678 B2* | 8/2013 | Kim | 715/838 |
| 8,531,532 B2* | 9/2013 | Imamura et al. | 348/207.1 |
| 2002/0003534 A1* | 1/2002 | Hayashi et al. | 345/204 |
| 2002/0009231 A1* | 1/2002 | Yamamoto et al. | 382/217 |
| 2002/0044128 A1* | 4/2002 | Hayashi et al. | 345/103 |
| 2002/0054157 A1* | 5/2002 | Hayashi et al. | 345/838 |
| 2002/0087602 A1* | 7/2002 | Masuda et al. | 707/515 |
| 2003/0020956 A1* | 1/2003 | Goel et al. | 358/1.18 |
| 2004/0130568 A1* | 7/2004 | Nagano et al. | 345/733 |
| 2006/0268315 A1* | 11/2006 | Randt | 358/1.15 |
| 2007/0044028 A1* | 2/2007 | Dunn et al. | 715/761 |
| 2007/0143667 A1* | 6/2007 | Deaton et al. | 715/513 |
| 2007/0143714 A1* | 6/2007 | Barbieri | 715/861 |
| 2007/0234223 A1* | 10/2007 | Leavitt et al. | 715/762 |
| 2008/0216005 A1* | 9/2008 | Bamba et al. | 715/765 |
| 2009/0043846 A1 | 2/2009 | Inoue | |
| 2010/0147956 A1* | 6/2010 | Wang et al. | 235/472.01 |
| 2010/0262928 A1* | 10/2010 | Abbott | 715/769 |
| 2010/0318905 A1* | 12/2010 | Rakesh | 715/702 |
| 2011/0072351 A1 | 3/2011 | Shintani et al. | |
| 2011/0225549 A1* | 9/2011 | Kim | 715/838 |
| 2011/0261210 A1* | 10/2011 | Imamura et al. | 348/207.1 |
| 2012/0019560 A1 | 1/2012 | Inoue | |
| 2012/0138684 A1* | 6/2012 | Van Volkinburg et al. | 235/455 |

FOREIGN PATENT DOCUMENTS

| | | |
|---|---|---|
| JP | 2009-044328 A | 2/2009 |
| JP | 2009-277151 A | 11/2009 |

OTHER PUBLICATIONS bing search q=configuration%20change%20target%20 May 30, 2015.* bing search q=configuration%20image%20target%20a May 30, 2015.*

* cited by examiner

| TIME POINT | EVENT | CPA | CPB | CPC | CPD | EMP0000000 |
|---|---|---|---|---|---|---|
| t1 | NO PARTICIPATION | A | B | C | D | |
| t2 | PARTICIPATION OF CPA | | B | C | D | A |
| t3 | PARTICIPATION OF CPB | | | C | D | A |
| t4 | PARTICIPATION OF CPC AND CPD | | | | | A |

INFORMATION STORAGE MEDIUM, TERMINAL DEVICE, DISPLAY SYSTEM, AND IMAGE GENERATING METHOD

The entire disclosure of Japanese Patent Application No. 2010-170620, filed Jul. 29, 2010 is expressly incorporated by reference herein.

BACKGROUND

1. Technical Field

The present invention relates to an information storage medium, a terminal device, a display system, and an image generating method.

2. Related Art

For example, in JP-A-2004-54783, a display system is disclosed in which captured image data that has been size-converted is received from a plurality of terminal devices, is composed as image data of one screen, and is displayed. In addition, in JP-A-2004-54783, it is described that an image displayed on a specific terminal device is enlarged, removed, or added by a user operating a remote controller of a display device.

However, for example, in a conference or the like, in a case where a presenter performs enlargement or the like of an image displayed on a terminal device used by a participant by using a remote controller in accordance with a request from the participant, the presenter needs to specify the image, understand the content of the request, and perform a remote controller operation in accordance with the request. Accordingly, it takes time to perform the operation. In addition, in JP-A-2004-54783, although it is described that a divided screen or the like to be displayed in an enlarged scale can be designated from the terminal device side, a specific technique is not described. Furthermore, in a case where a participant performs changing of the configuration of an image displayed by a display device or the like by using his or her own terminal device, an operation for changing the configuration or the like needs to be performed in an easy manner.

SUMMARY

An advantage of some aspects of the invention is that it provides an information storage medium, a terminal device, a display system, and an image generating method that allow a user to perform an operation for changing the configuration of the entire image in an easy manner in a case where the entire image including individual images that are based on image information transmitted from terminal devices is displayed by the display device.

An information storage medium according to one aspect of the invention stores a program that can be read out by a computer included in a terminal device. The program allows the computer to perform: generating a configuration change image used for changing a configuration of an entire image which includes an individual image on the basis of image information supplied from one or more terminal devices and includes an individual image arranging area that is divided into a plurality of display target areas and an icon arranging area including an icon of each terminal device, the individual image arranging area represents an arrangement of the individual image in the entire image displayed by a display device; and altering the configuration change image such that a mark image corresponding to the icon represented in input operation information is arranged in the display target area.

A terminal device according to one aspect of the invention includes: an image generating unit generates a configuration change image used for changing a configuration of an entire image displayed by a display device which includes an individual image on the basis of image information supplied from one or more terminal devices which includes the terminal device; and an input unit to which operation information representing an operation relating to a change in the configuration is input. The configuration change image includes an individual-image arranging area divided into a plurality of display target areas and an icon arranging area including the icon of each of the terminal devices, the individual image arranging area represents an arrangement of the individual image in the entire image, and the image generating unit alters the configuration change image such that a mark image corresponding to the icon represented in the input operation information is arranged in the display target area.

A display system according to one aspect of the invention includes a terminal device that includes: an image generating unit that generates a configuration change image used for changing a configuration of an entire image displayed by a display device which includes an individual image on the basis of image information supplied from one or more terminal devices; an input unit to which operation information representing an operation relating to a change in the configuration is input; and a transmission unit that, in a case where the individual image is displayed, transmits image information representing the individual image toward the display device, and a display device that includes: a reception unit that receives the image information; a display-side image generating unit that generates the entire image based on the image information; and a display-side display unit that displays the entire image.

The configuration change image includes an individual-image arranging area divided into a plurality of display target areas and an icon arranging area including the icon of each of the terminal devices, and the individual image arranging area represents an arrangement of the individual image in the entire image. In addition, the image generating unit alters the configuration change image such that a mark image corresponding to the icon represented in the input operation information is arranged in the display target area.

A method of generating an image according to one aspect of the invention generates a configuration change image used for changing a configuration of an entire image displayed by a display device which includes an individual image on the basis of image information supplied from one or more terminal devices. The configuration change image includes an individual-image arranging area divided into a plurality of display target areas and an icon arranging area including the icon of each of the terminal devices, and the individual image arranging area represents an arrangement of the individual image in the entire image. The terminal devices alters the configuration change image such that a mark image corresponding to the icon represented in the input operation information is arranged in the display target area.

According to some aspects of the invention, the terminal device and the like also respond to an operation other than the drag-and-drop operation, and whereby the operation for changing the configuration of the entire image can be easily performed in a case where the entire image including the individual image on the basis of the image information supplied from the terminal device is displayed by the display device.

In addition, according to some aspects of the invention, the terminal device and the like may arrange the mark image in accordance with an operation performed in a state in which the icon is set as the operation target so as to be displayed in a highlighted mode.

In addition, according to some aspects of the invention, the terminal device and the like may arrange the mark image in accordance with an operation performed in a state in which the mouse pointer overlaps the icon.

In addition, according to some aspects of the invention, the terminal device and the like may arrange the mark image in accordance with a double-click operation performed in the state in which the mouse pointer overlaps the icon.

Furthermore, according to some aspects of the invention, the terminal device and the like may automatically arrange the mark image in a vacant area or the like.

BRIEF DESCRIPTION OF THE DRAWINGS

The invention will be described with reference to the accompanying drawings, wherein like numbers reference like elements.

FIG. 9 is a diagram illustrating an example of an image transition in each device according to the first embodiment.

FIG. 10 is a diagram illustrating another example of an image transition in each device according to the first embodiment.

FIG. 11 is a diagram illustrating yet another example of an image transition in each device according to the first embodiment.

DESCRIPTION OF EXEMPLARY EMBODIMENTS

Hereinafter, a personal computer (PC) according to an embodiment of the invention will be described with reference to the accompanying drawings. However, the embodiments shown below do not limit the content of the invention defined in the appended claims in any way. In addition, not all the configurations shown in the embodiments described below are determined as essential for realizing the invention defined in the appended claims.

First Embodiment

Figure 1:
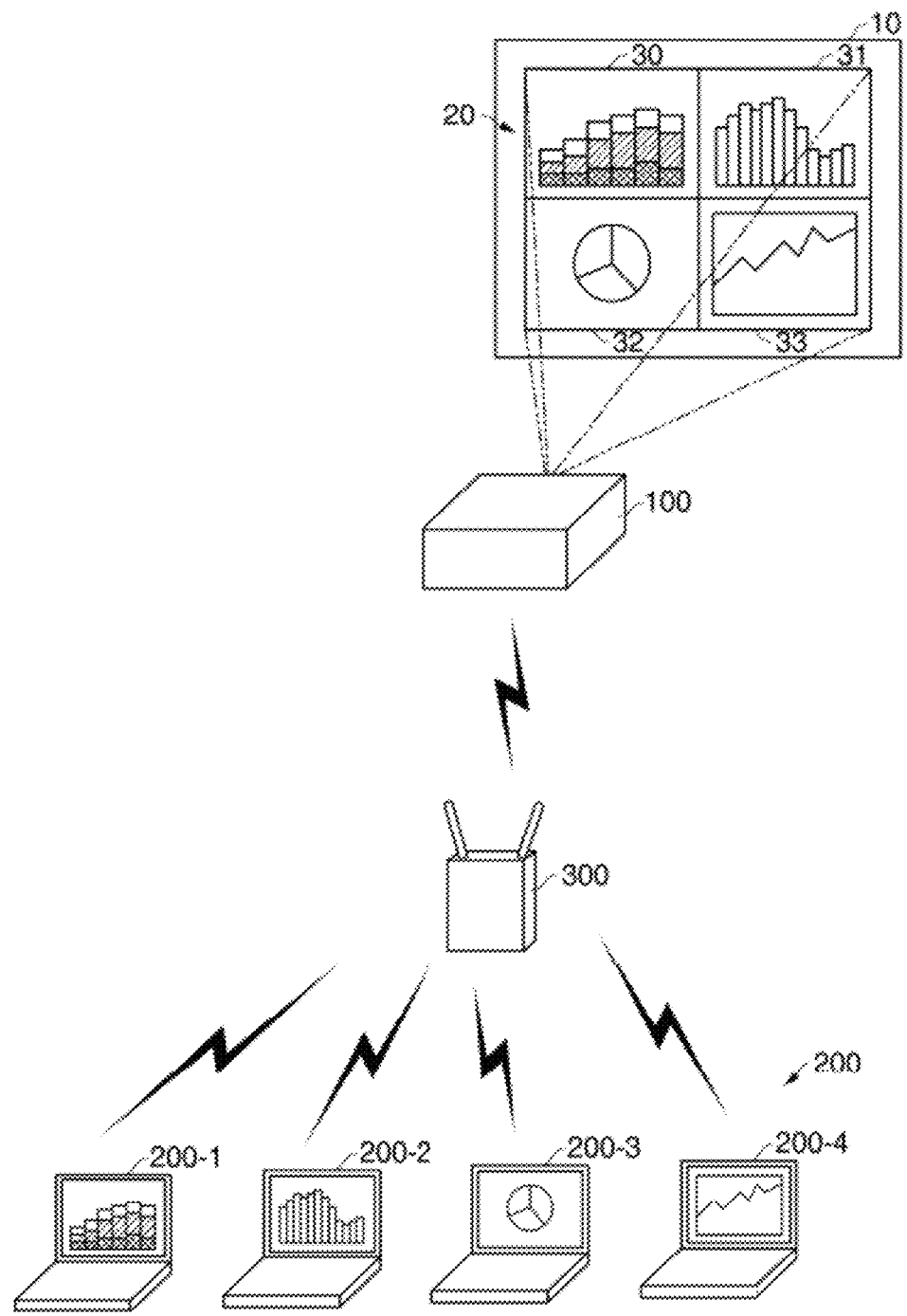
FIG. 1 is a diagram illustrating the display state of an entire image according to a first embodiment.

FIG. 1 is a diagram illustrating the display state of an entire image 20 according to a first embodiment. In this embodiment, one projector 100 and four PCs 200-1 to 200-4 are connected to each other through an access point 300 in a wireless manner, and the projector 100 projects the entire image 20 including a maximum of four individual images 30 to 33 onto a screen 10 based on image information supplied from each of the PCs 200. For example, a participant participating in a conference can change the configuration of individual images 30 to 33 on the entire image 20 by operating an icon or the like of a configuration change image displayed on the PC 200 used by the participant. In addition, the projector 100 is one type of display device, the PC 200 is one type of terminal device, and the projector 100 and the PCs 200 may be arranged in the same room or in different rooms. Next, the functional blocks of the projector 100 and the PC 200 having such functions will be described.

Figure 2:
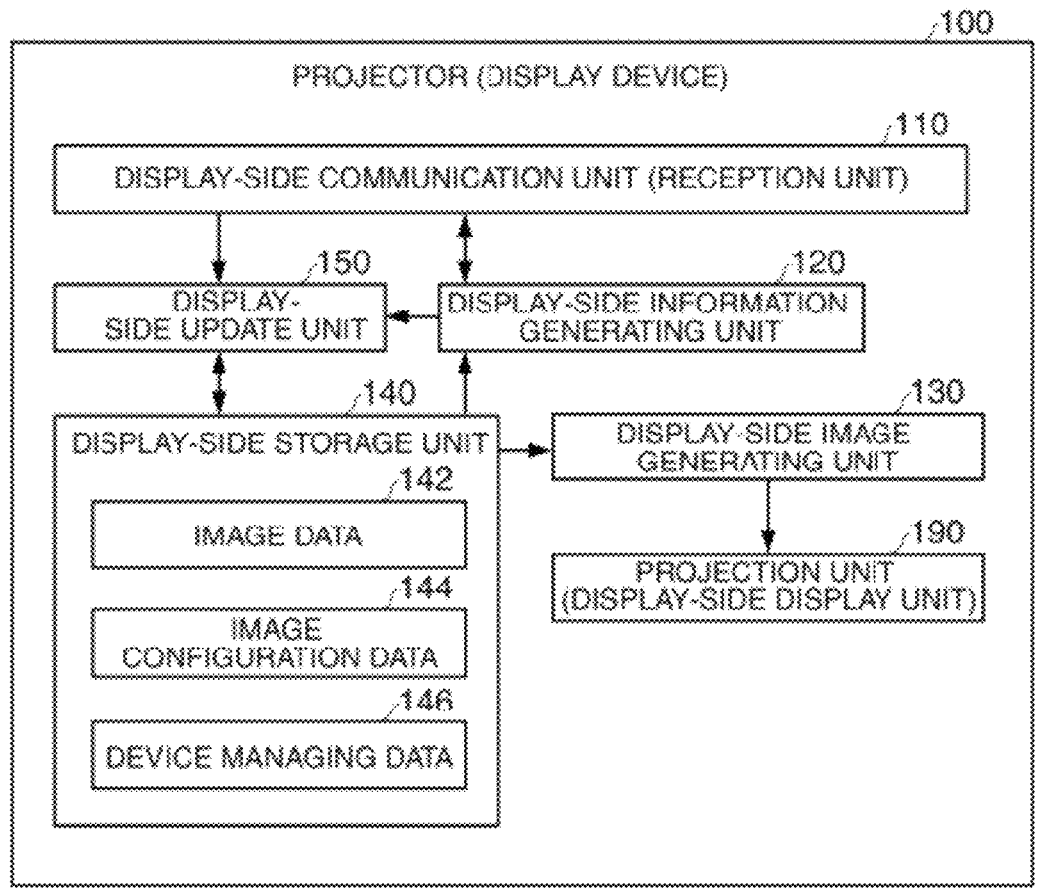
FIG. 2 is a functional block diagram of a projector according to the first embodiment.

FIG. 2 is a functional block diagram of a projector 100 according to the first embodiment. The projector 100 is configured so as to include: a display-side communication unit 110 that communicates with the PC 200 through the access point 300; a display-side information generating unit 120; a display-side image generating unit 130; a display-side storage unit 140; a display-side update unit 150 that updates data stored in the display-side storage unit 140; and a projection unit 190 that is one type of display-side display unit. In addition, the display-side storage unit 140 stores image data 142 that represents image information or the like transmitted from the PC 200, image configuration data 144 that represents the configuration of the entire image 20 and the configuration change image, device managing data 146 that represents a device as a communication target, and the like therein. Here, the display-side communication unit 110 is one type of reception unit that receives image information and the like from the PC 200.

Figure 3:
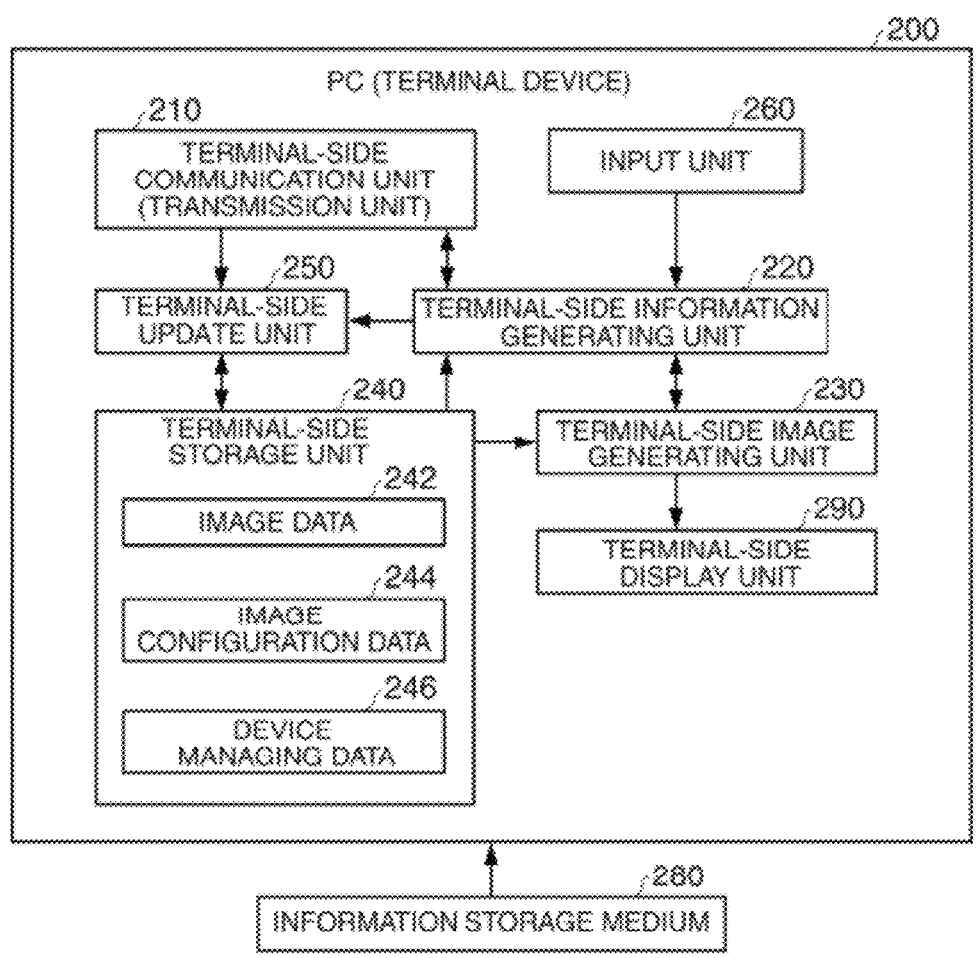
FIG. 3 is a functional block diagram of a personal computer according to the first embodiment.

FIG. 3 is a functional block diagram of the PC 200 according to the first embodiment. The PC 200 is configured so as to include: a terminal-side communication unit 210 that communicates with the projector 100 through the access point 300; a terminal-side information generating unit 220; a terminal-side image generating unit 230; a terminal-side storage unit 240; a terminal-side update unit 250 that updates data stored in the terminal-side storage unit 240; and a terminal-side display unit 290. In addition, the terminal-side storage unit 240 stores image data 242 that represents image information or the like, image configuration data 244 that represents the configuration of the configuration change image, device managing data 246 that represents a communication target device, and the like therein. Furthermore, the terminal-side communication unit 210 is one type of transmission unit that transmits image information and the like to the projector 100.

The projector 100 and the PC 200 may use the following hardware and serve as each unit described below. For example, in the projector 100 and the PC 200, the display-side communication unit 110 and the terminal-side communication unit 210 may use wireless communication units or the like, the display-side information generating unit 120, the display-side update unit 150, the terminal-side information generating unit 220, and the terminal-side update unit 250 may use CPUs or the like, the display-side image generating unit 130 and the terminal-side image generating unit 230 may use image processing circuits or the like, the display-side storage unit 140 and the terminal-side storage unit 240 may use RAMs or the like, the input unit 260 may use a universal serial bus (USB) port that is connected to a keyboard, a mouse, or the like, the projection unit 190 may use a lamp, a liquid crystal panel, a liquid crystal driving circuit, a lens, or the like, and the terminal-side display unit 290 may use a back light, a liquid crystal panel, a liquid crystal driving circuit, or the like. The computer included in the PC 200 may serve as the terminal-side image generating unit 230 or the like by reading out the program stored in the information storage medium 280. As such information storing media 280, for example, there are CD-ROMs, DVD-ROMs, ROMs, RAMs, HDDs, and the like.

Figure 4:
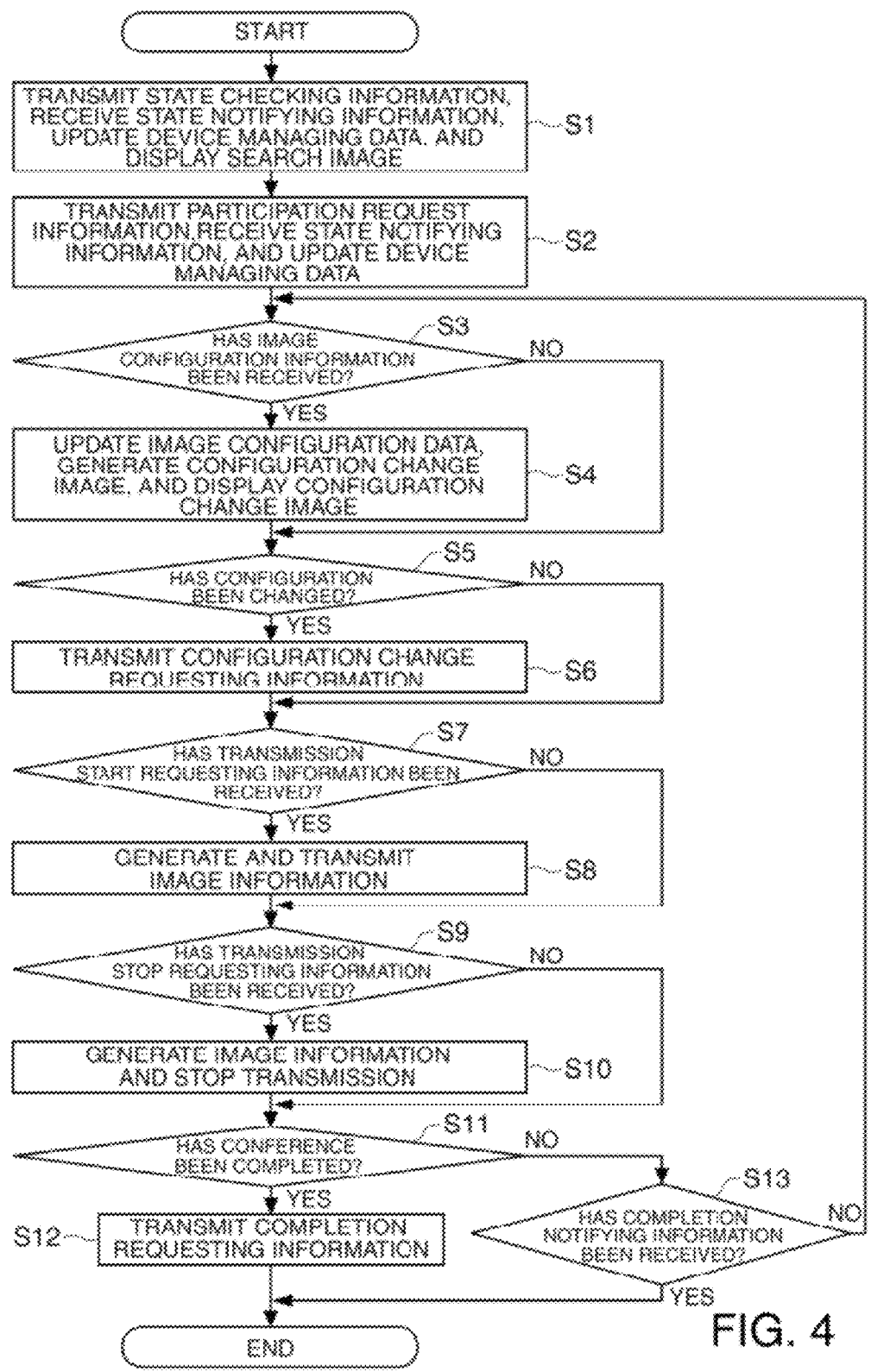
FIG. 4 is a flowchart illustrating the image displaying sequence of a personal computer according to the first embodiment.
Figure 5:
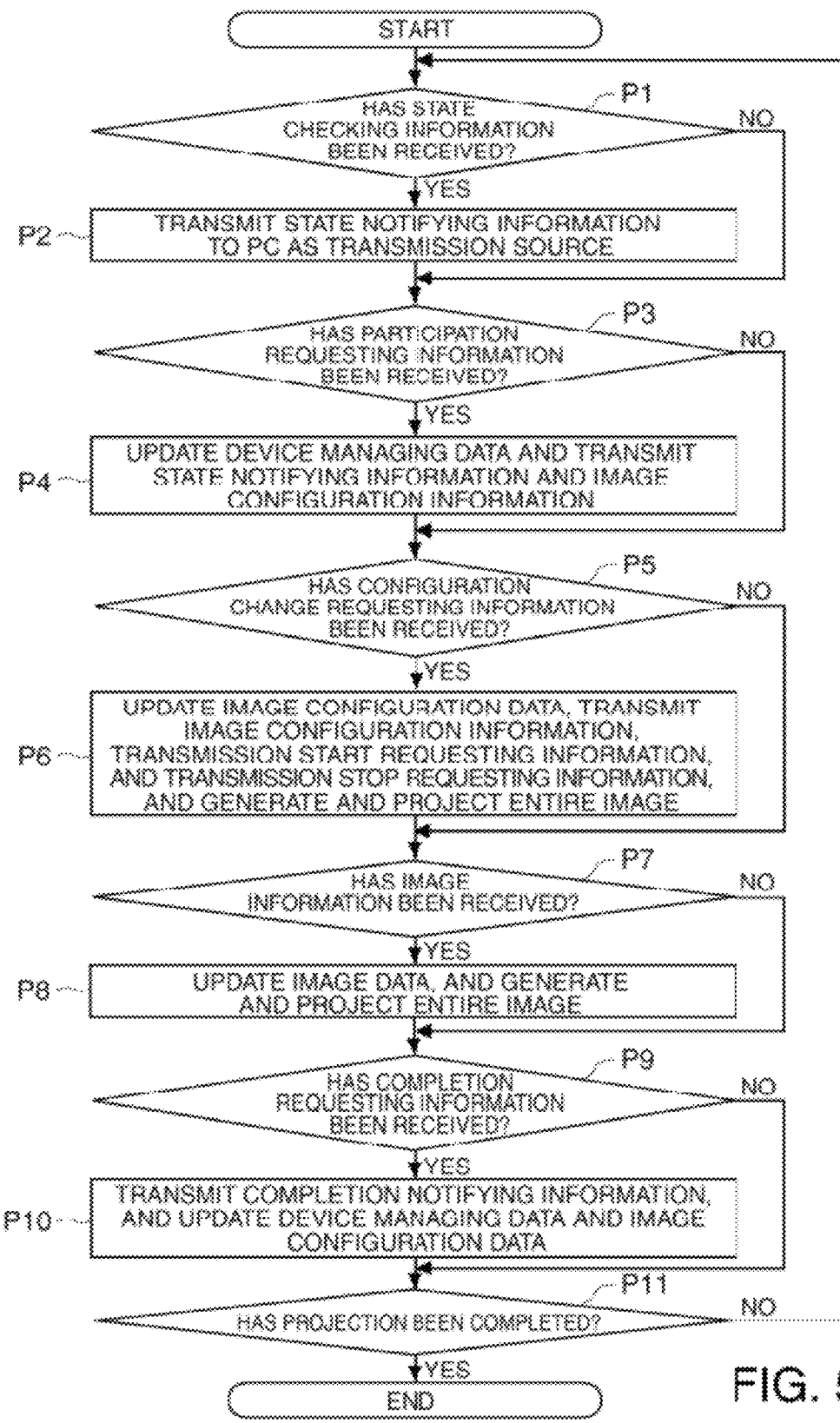
FIG. 5 is a flowchart illustrating the image displaying sequence of a projector according to the first embodiment.
Figure 6:
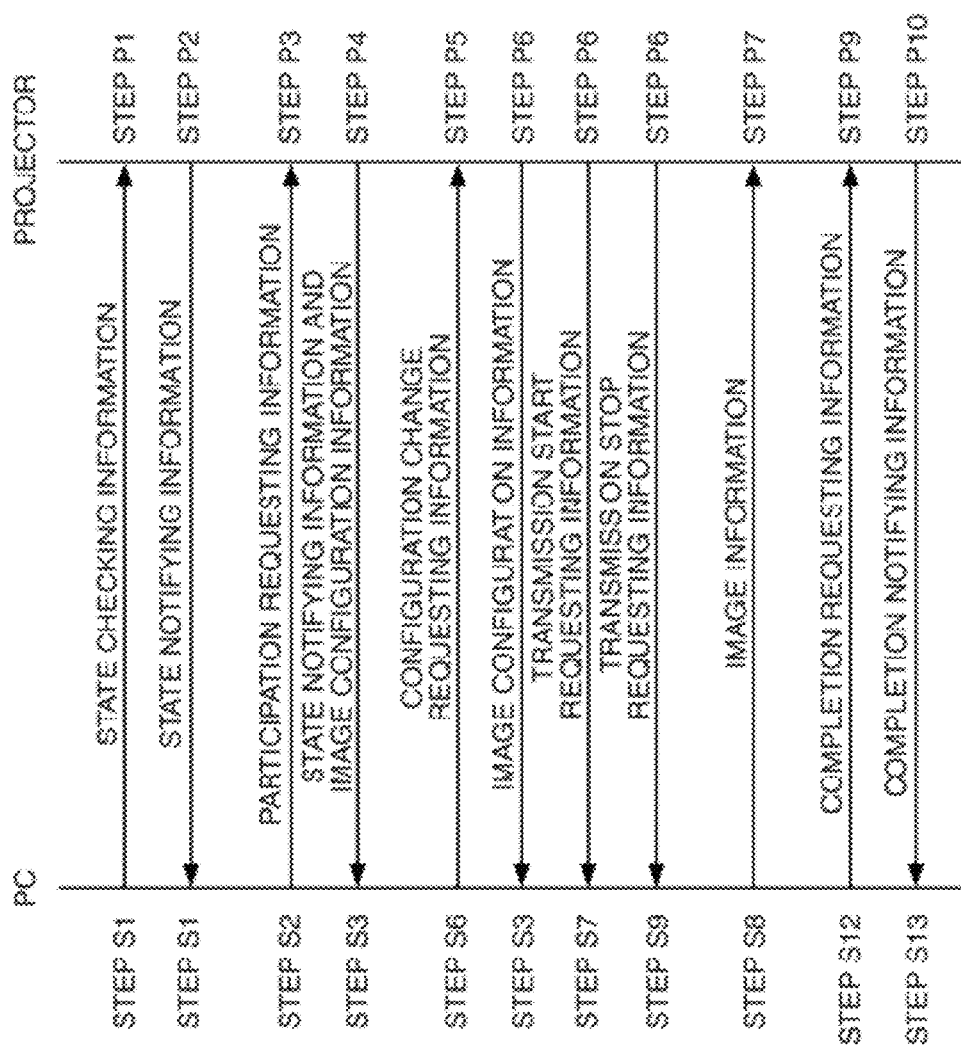
FIG. 6 is a sequence diagram illustrating the transmission/reception of information between the personal computer and the projector according to the first embodiment.

Next, the projection sequence of the entire image 20 according to a configuration change request of an image by using the projector 100 and the PC 200 will be described. FIG. 4 is a flowchart illustrating the image displaying sequence of the PC 200 according to the first embodiment. FIG. 5 is a flowchart illustrating the image displaying sequence of the projector 100 according to the first embodiment. In addition, FIG. 6 is a sequence diagram illustrating the transmission/reception of information between the PC 200 and the projector 100 according to the first embodiment.

First, the image displaying sequence of the PC 200 will be described with reference to FIG. 4. A participant in a conference, in order to connect his or her PC 200 to the projector 100, operates a keyboard, a mouse, or the like of the PC 200, thereby issuing an execution instruction of a projector search program. It is assumed that the projector search program is installed to the PC 200 in advance. The terminal-side information generating unit 220 generates state checking information used for checking the connection state of each device on a network and the like based on information representing the execution instruction input from the input unit 260, and the terminal-side communication unit 210 transmits the state checking information to the projector 100 and receives state notifying information that represents the connection state or the like of each device from the projector 100. The terminal-side update unit 250 updates the device managing data 246 based on the state notifying information, the terminal-side image generating unit 230 generates a search image that represents a search result of the projector based on the image data 242 and the device managing data 246, and the terminal-side display unit 290 displays the search image (Step S1).

Figure 7:
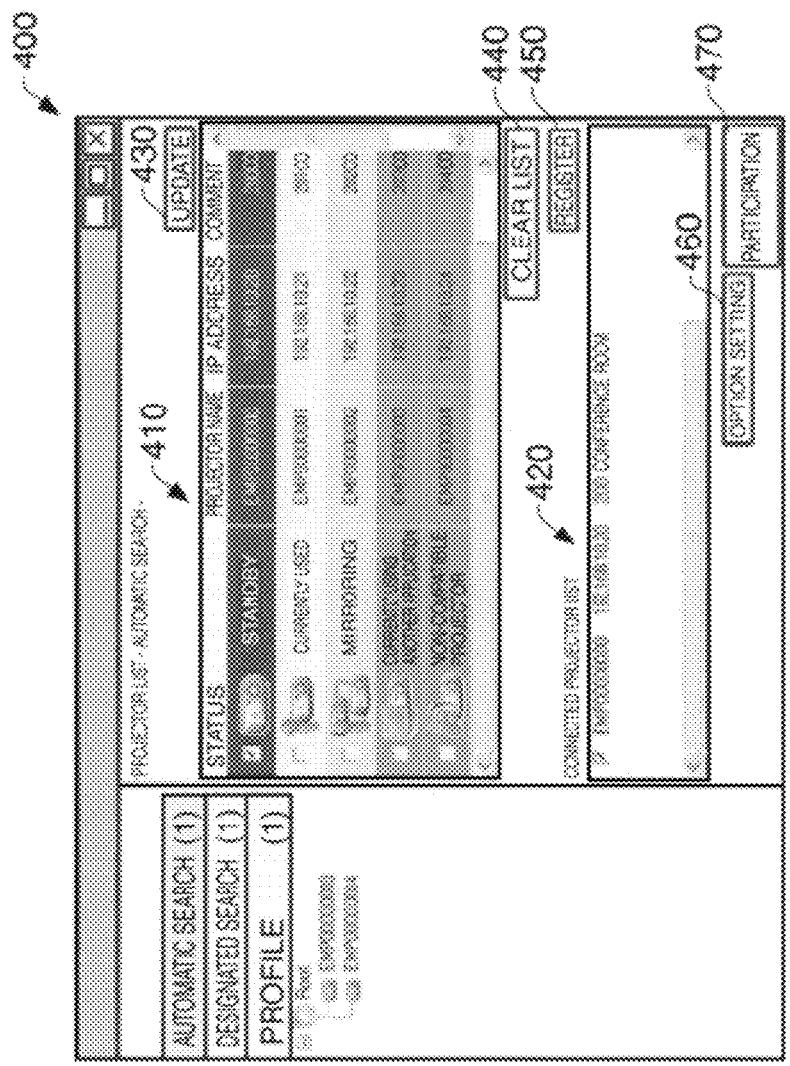
FIG. 7 is a diagram illustrating an example of a search image according to the first embodiment.

FIG. 7 is a diagram illustrating an example of a search image 400 according to the first embodiment. The search image 400 is an image that is displayed on the screen of the PC 200 by executing the above-described projector search program in the PC 200. The search image 400 includes: a search result displaying area 410 that represents the projector state, a projector name, an IP address, and the like that are represented in the device managing data 246; a connected projector list displaying area 420 that represents projectors as connection destinations; an update button image 430 that is used for acquiring a recent search result; a clear button image 440 that is used for clearing the connected projector list displaying area 420; a registration button image 450 that is used for registering a new projector in the connected projector list displaying area 420; an option setting button image 460; and a participation button image 470 used for participating in a conference (connects the PC 200 to the projector 100).

The participant issues a participation instruction for the conference by clicking on the participation button image 470 using the mouse of the PC 200. The terminal-side information generating unit 220 generates participation request information based on the information that represents the participation instruction transmitted from the input unit 260, and the terminal-side communication unit 210 transmits the participation request information to the projector 100 and receives the state notifying information from the projector 100. The terminal-side update unit 250 updates the device managing data 246 based on the state notifying information (Step S2).

The terminal-side update unit 250 determines whether or not the terminal-side communication unit 210 has received image configuration information representing the configuration of a configuration change image from the projector 100 (Step S3). In a case where the image configuration information has been received, the terminal-side update unit 250 updates the image configuration data 244 based on the image configuration information. The terminal-side image generating unit 230 generates a configuration change image based on the image configuration data 244, and the terminal-side display unit 290 displays the configuration change image (Step S4).

Figure 8:
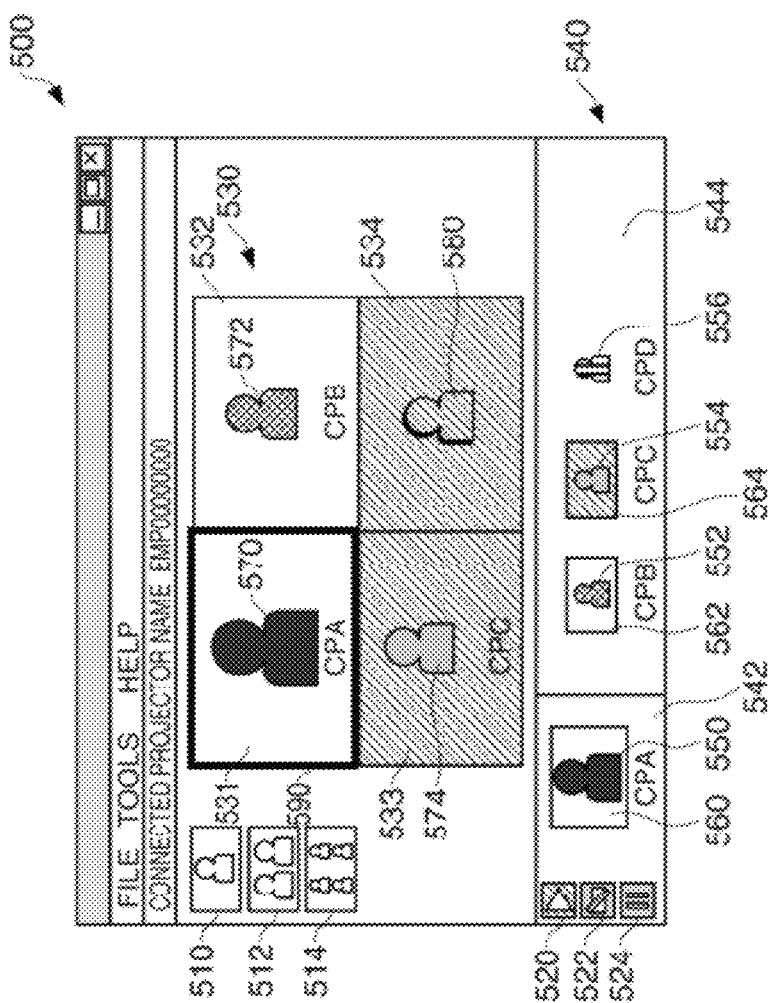
FIG. 8 is a diagram illustrating an example of a configuration change image according to the first embodiment.

FIG. 8 is a diagram illustrating an example of a configuration change image 500 according to the first embodiment. The configuration change image 500 includes: display mode button images 510 to 514 that are used for changing the number of individual images configuring the entire image 20; an individual-image arranging area 530 that is configured by four display target areas 531 to 534 forming two rows and two columns; a display button image 520 that is used for instructing the display of the entire image 20; an image mute button image 522 that is used for issuing an instruction for displaying a user logo image or the like instead of the entire image 20; a pause button image 524 that is used for issuing an instruction for maintaining the current display of the entire image 20; an icon arranging area 540 in which icons 550 to 556 are arranged; a rectangular cursor image 590 that is used for moving among the display target areas 531 to 534 in accordance with an operation so as to select an individual image to be displayed; and the like. In addition, the configuration change image 500 includes a menu image that represents "file", "tools", and "help", an image that represents a connected projector name, and the like.

For example, the configuration change image 500 shown in FIG. 8 is an image that is displayed on a screen of the PC 200-1 (computer name is "CPA"). In the individual-image arranging area 530, a mark image 570 that represents "CPA" is arranged in a display target area 531 located on an upper-left area, a mark image 572 that represents "CPB" (PC 200-2) is arranged in a display target area 532 located on an upper right area, and a mark image 574 that represents "CPC" (PC 200-3) is arranged in a display target area 533 located in the lower left area. In addition, in a display target area 534 located in the lower right area, a mark image is not arranged, and accordingly, a depressed image 580 in which a mark image has a depressed shape is arranged. In addition, in a case where the mark images 570 to 574 are currently displayed in the entire image 20, the backgrounds of the mark images 570 to 574 are displayed in white. On the other hand, in a case where the mark images 570 to 574 are not currently displayed, the backgrounds of the mark images 570 to 574 are displayed in gray. For example, in the example shown in FIG. 8, the backgrounds of the mark images 570 and 572 are in white, which represents two individual images of the PC 200-1 and PC 200-2 that are horizontally aligned so as to be arranged in the entire image 20. In addition, the background of the depressed image 580 is in gray.

In addition, in the icon arranging area 540, icons 552 to 556 representing other PCs 200 are arranged in the order of participation (the order of connection to the projector 100) from the left side in an other-device area 544 located on the right side, and an icon 550 that represents the own device is fixedly arranged in an own device area 542 located on the left side regardless of the order of the participation. The backgrounds of the icons 550 to 556 are changed in accordance with the display states of the individual-image arranging area 530. For example, in the example shown in FIG. 8, icon background images 560 and 562 arranged on the backgrounds of the icons 550 and 552 that are in the current-display state, in which a mark image is displayed and a corresponding individual image is displayed, are displayed in white (first state), and an icon background image 564 arranged on the background of the icon 554 that is in a display standby state, in which a mark image is displayed but an individual image is not displayed, is displayed in gray (second state). In addition, on the background of an icon 556 that is in the non-display state in which any mark image is not displayed, nothing is displayed (third state). Furthermore, the icon 550 of the own terminal device is displayed to be larger than the icons 552 to 556 of other terminal devices, and the mark image 570 of the own terminal device is displayed to be larger than the mark images 572 and 574 of other terminal devices. The icons 550 to 556 are respectively displayed in different colors, and the mark images 570 to 574 are respectively displayed in different colors as well. In addition, the icons 550 to 556 and the mark images 570 to 574 are displayed with the host names (the name can also be set by a user) of the PCs 200 being added thereto.

According to this embodiment, when the projector 100 and the PC 200 set up a connection, the PC 200 is notified of first state notifying information including color information unique to the PC 200 that is assigned by the projector 100. Here, the color information is information that is used for designating a color used for an icon and a mark image. The color information may be a numeric value corresponding to a color set in advance or text data that represents the name of the color. Furthermore, the color information may be an RGB value that is represented by a predetermined number of bits. The PC 200 that has newly setup a connection with the projector 100 notifies other PCs 200 and other terminal devices that have already set up connections with the projector 100 of second state notifying information including color information unique to the PC 200 that is assigned by the projector 100. Other PCs 200 that have received the color information from the PC 200 that has newly set up the connection with the PC 100 notifies other PCs 200 that have set up connections with the projector 100 of third state notifying information including color information that is assigned to each own terminal device. Accordingly, the correspondence between the color of the icon arranged in the icon arranging area 540 of the configuration change image 500 and the PC 200 that has set up a connection with the projector 100 is the same in any PC 200. Therefore, even in a case where a plurality of PCs 200 has setup connections with the projector 100, each participant can easily specify a desired PC 200 by using the color of the icon. In addition, in a case where the projector 100 transmits the first state notifying information including the color information of all the PCs 200, the notification of the third state notifying information is not necessary.

Each participant operating each PC 200 can display and operate the search image 400 and the configuration change image 500 on the screen of each PC 200 and can change the configuration of the individual-image arranging area 530, for example, by performing drag-and-drop of the icons 550 to 556 from the icon arranging area 540 to the individual-image arranging area 530. For example, each participant moves a mouse pointer up to the display target area 532 located on the upper right side (icon having the same shape as the icon 552 is moved in association with the mouse pointer in the state in which the icon 552 is left in the icon arranging area 540) and separates the finger from the mouse in the state in which the mouse pointer is clicked overlapping the position of the icon 552 of the PC 200-2 (CPB), whereby the mark image 572 corresponding to the PC 200-2 can be arranged in the display target area 532. Accordingly, the entire image 20 including the individual image of the PC 200-2 can be projected to the projector 100. The terminal-side information generating unit 220 determines whether there is a configuration change operation based on the information transmitted from the input unit 260 (Step S5). When there is the configuration change operation, the terminal-side information generating unit 220 generates configuration change request information, and the terminal-side communication unit 210 transmits the configuration change request information to the projector 100 (Step S6).

In addition, the terminal-side information generating unit 220 determines whether or not the transmission start request information of image information has been received from the projector 100 by the terminal-side communication unit 210 (Step S7). When the transmission start request information is received, the terminal-side information generating unit 220 generates image information representing a graph image shown in FIG. 1 or the like based on the image data 242, and the terminal-side communication unit 210 transmits the image information to the projector 100 (Step S8). In addition, the terminal-side image generating unit 230 generates a graph image shown in FIG. 1 or the like, consecutively captures the graph image or the like, and stores the graph image or the like in the terminal-side storage unit 240 as the image data 242.

Furthermore, the terminal-side information generating unit 220 determines whether or not transmission stop request information of the image information has been received from the projector 100 by the terminal-side communication unit 210 (Step S9). When the transmission stop request information is received, the terminal-side information generating unit 220 stops generating the image information, and the terminal-side communication unit 210 stops the transmitting of the image information (Step S10). In such a case, the terminal-side image generating unit 230 may stop the capturing of the image.

In addition, the participant can cut off the communication of his or her own PC 200 by selecting "leave" from a submenu of "tools" of the configuration change image 500, and the participant can cut off the communication of all the PCs 200 by selecting "completion of conference" from the submenu. The terminal-side information generating unit 220 determines whether or not "completion of conference" has been selected based on information input from the input unit 260 (Step S11). When "completion of conference" is selected, the terminal-side information generating unit 220 generates completion request information, and the terminal-side communication unit 210 transmits the completion request information to the projector 100 (Step S12). In addition, the terminal-side information generating unit 220 determines whether or not completion notifying information transmitted from the projector 100 in accordance with the reception of the completion request information has been received by the terminal-side communication unit 210 (Step S13). In a case where the completion request information is transmitted or the completion notifying information is received, the PC 200 completes a series of processes described above and displays the search image 400. On the other hand, in a case where the completion of the processes is not required, the PC 200 repeatedly performs the process of Steps S3 to S13 described above. In addition, when "completion of conference" is selected, the terminal-side information generating unit 220 may generate a confirmation image that represents a text string of "All the users participating in the conference will be cut off from the projector and are returned to a search screen. Has the conference been completed?". In addition, in a case where the completion notification information is received, the terminal-side information generating unit 220 may generate a notification image that represents a text string of "The conference has been completed by other users. Now, the search screen will be returned".

Next, the processing sequence of the projector 100 will be described with reference to FIG. 5. The display-side information generating unit 120 determines whether or not the state checking information has been received from the PC 200 by using the display-side communication unit 110 (Step P1). When the state checking information is received, the display-side information generating unit 120 generates state notifying information based on the device managing data 146, and the display-side communication unit 110 transmits the state notifying information to the PC 200 as a transmission source (Step P2).

In addition, the display-side update unit 150 determines whether or not the participation request information has been received from the PC 200 by the display-side communication unit 110 (Step P3). When the participation request information has been received, the display-side update unit 150 updates the device managing data 146 based on the participation request information. In addition, in this case, the display-side information generating unit 120 generates the state notifying information based on the device managing data 146 and generates image configuration information based on the image configuration data 144 as necessary. The display-side communication unit 110 transmits the state notifying information and the image configuration information to each participating PC 200 (Step P4).

Furthermore, the display-side update unit 150 determines whether or not the configuration change request information has been received from the PC 200 by the display-side communication unit 110 (Step P5). When the configuration change request information is received, the display-side update unit 150 updates the image configuration data 144 based on the configuration change request information. In addition, in this case, the display-side information generating unit 120 generates the image configuration information based on the image configuration data 144 and generates transmission start requesting information and transmission stop requesting information as necessary. To be more specific, for example, in a case where an individual image needs to be newly displayed, the display-side information generating unit 120 generates the transmission start requesting information for the PC 200 that is the transmission source of the image information of the individual image. On the other hand, in a case where the individual image does not need to be displayed, the display-side information generating unit 120 generates the transmission stop requesting information for the PC 200 that is the transmission source of the image information of the individual image. The display-side communication unit 110 transmits the image configuration information, the transmission start requesting information, and the transmission stop requesting information to each participating PC 200. In addition, the display-side image generating unit 130 generates an entire image 20 in accordance with the image configuration based on the image data 142 and the image configuration data 144, and the projection unit 190 projects the entire image 20 (Step P6).

In addition, the display-side update unit 150 determines whether or not the image information has been received from the PC 200 by the display-side communication unit 110 (Step P7). When the image information is received, the display-side update unit 150 updates the image data 142 based on the image information. In addition, in this case, the display-side image generating unit 130 generates the entire image 20 based on the image data 142 and the image configuration data 144, and the projection unit 190 projects the entire image 20 (Step P8).

The display-side information generating unit 120 determines whether or not completion requesting information has been received from the PC 200 by the display-side communication unit 110 (Step P9). When the completion requesting information is received, the display-side information generating unit 120 generates completion notifying information. The display-side communication unit 110 transmits the completion notifying information to each PC 200. The display-side update unit 150 updates the device managing data 146 and the image configuration data 144, for example, to be the initial states or the like in accordance with the completion of the conference (Step P10). The projector 100 determines whether or not there is a projection completion instruction (Step P11). When there is the projection completion instruction, the projector 100 completes a series of processes described above.

Figure 10:
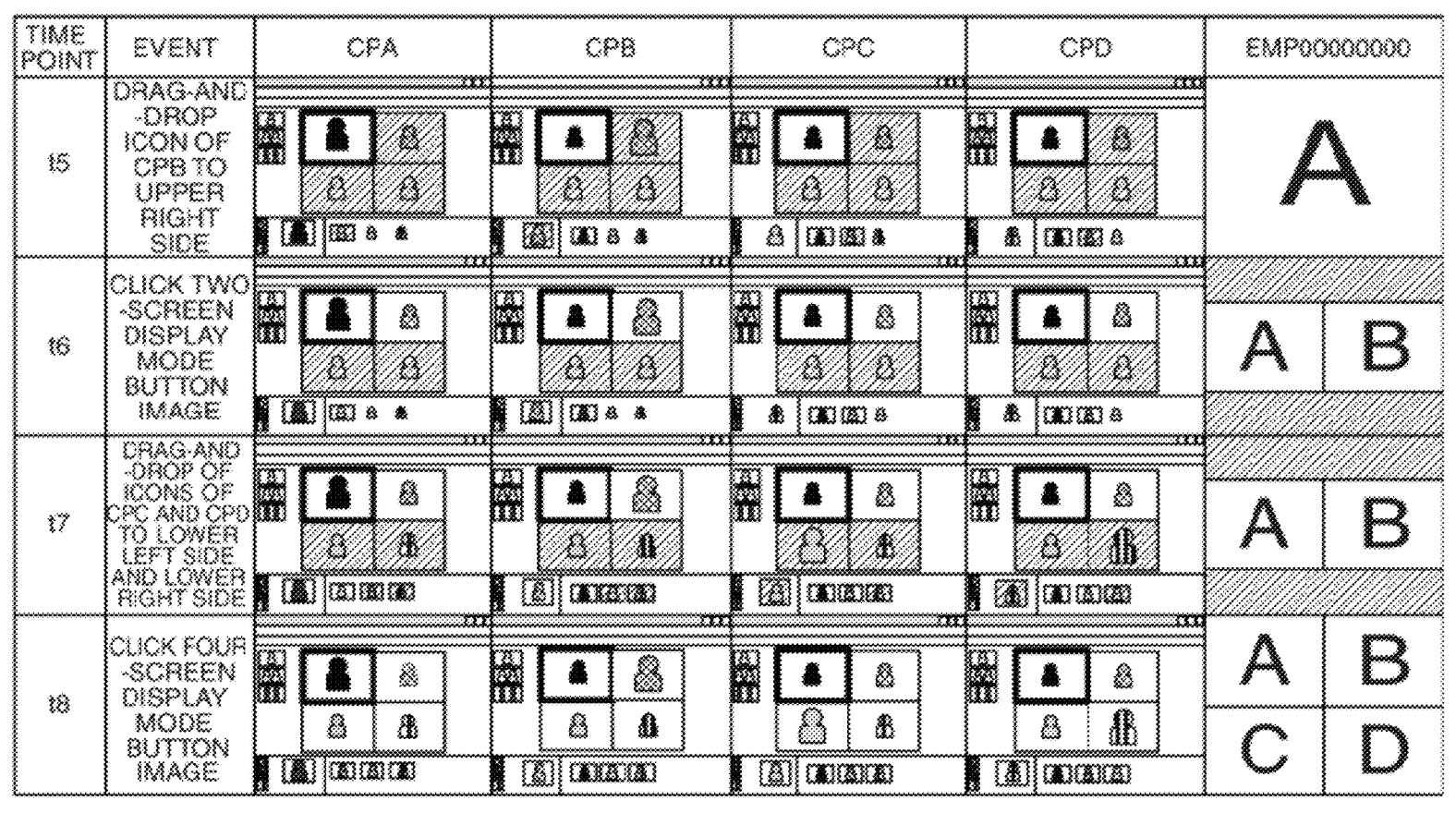
Figure 11:
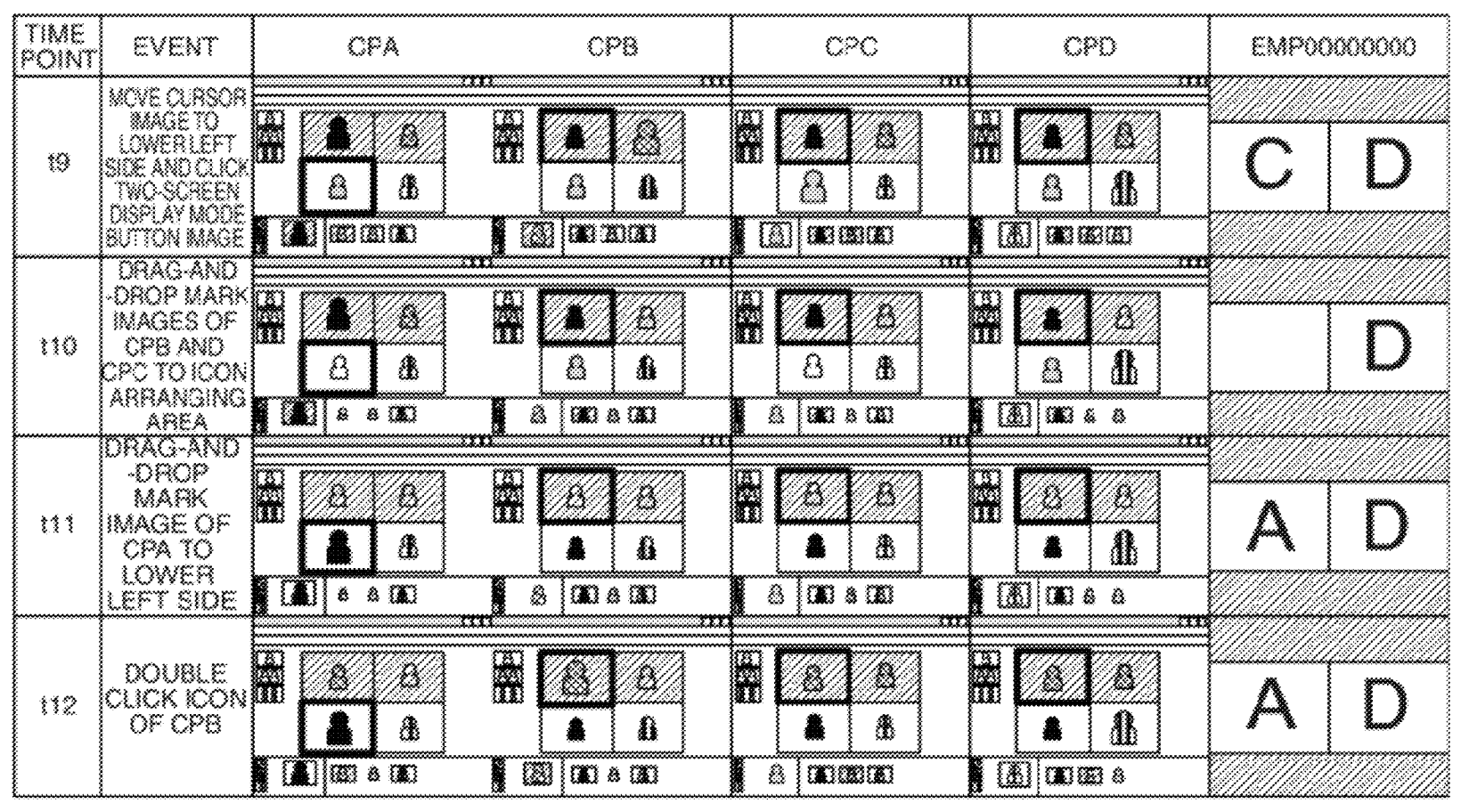

Here, an image transition in the projector 100 and the PCs 200-1 to 200-4 will be described in more detail. FIG. 9 is a diagram illustrating an example of an image transition in each device according to the first embodiment. FIG. 10 is a diagram illustrating another example of an image transition in each device according to the first embodiment. FIG. 11 is a diagram illustrating yet another example of image transition in each device according to the first embodiment. Here, for simplification of the description, it is assumed that the PC 200-1 (CPA) displays an image A, the PC 200-2 (CPB) displays an image B, the PC 200-3 (CPC) displays an image C, and the PC 200-4 (CPD) displays an image D. In addition, time points t1 to t12 are assumed as continuous time points.

At the time point t1, there is no PC 200 participating in a conference, and the projector 100 (EMP00000000) projects a single-color image. At the time point t2, in a case where CPA participates in the conference first, the projector 100 projects an entire image 20 including the image A of CPA in accordance with the participation. On the other hand, at the time point t3, in a case where CPB participates in the conference, the projector 100 does not automatically project the image B and continues to project the entire image 20 including the image A of CPA. Furthermore, at the time point t4, in a case where CPC and CPD participate in the conference, the projector 100 does not automatically project the image C and the image D and continues to project the entire image 20 including the image A of CPA. In other words, while automatically projecting the image of the PC 200 participating in the conference first regardless of whether there is an explicit display instruction, the projector 100 does not project the image of the PC 200 that participates in the conference second or later and after that without an explicit display instruction.

At the time point t5, in a case where the participant operating CPA performs drag-and-drop of the icon of CPB in an upper right area of the individual-image arranging area 530 in the configuration change image 500 displayed on the PC 200-1, the display mode is maintained to be a one-screen display mode, and accordingly, the entire image 20 projected by the projector 100 is not changed. In addition, even in a case where drag-and-drop of the icon is performed from the icon arranging area 540 to the individual-image arranging area 530, the icon remains in the icon arranging area 540, and a mark image corresponding to the icon is added to the individual-image arranging area 530. At the time point t6, in a case where the participant operating CPA clicks on a two-screen display mode button image 512 on the configuration change image 500 displayed in the PC 200-1, the projector 100 projects an entire image 20 including images A and B corresponding to the mark images located in the row in which the cursor image 590 is present. In addition, in this case, the background of the display target area 532 located on the upper right side in the individual-image arranging area 530 of the PCs 200 is changed from gray to white.

At the time point t7, in a case where the participant operating CPA, in the configuration change image 500 displayed in the PC 200-1, performs drag-and-drop for the icon of CPC to the lower left area of the individual-image arranging area 530 and performs drag-and-drop for the icon of CPD to the lower right area of the individual-image arranging area 530, depressed images are changed to mark images in the display target areas 533 and 534 of each PC 200, but the entire image 20 projected by the projector 100 is not changed.

At the time point t8, in a case where the participant operating CPA clicks on a four-screen display mode button image 514 on the configuration change image 500 displayed in the PC 200-1, the projector 100 projects an entire image 20 including images A, B, C, and D corresponding to the mark images placed in the individual-image arranging area 530. In addition, in this case, the background of the display target area 533 located on the lower left side of the individual-image arranging area 530 of each PC 200 and the background of the display target area 534 located on the lower right side thereof are changed in color from gray to white, and the icon background images of the icons of CPC and CPD are changed in color from gray to white.

At the time point t9, in a case where the participant operating CPA moves the cursor image 590 to the display target area 533 located on the lower left side and clicks on the two-screen display mode button image 512 in the configuration change image 500 displayed in the PC 200-1, the projector 100 projects an entire image 20 including images C and D corresponding to the mark images placed in the individual-image arranging area 530. In addition, in this case, the background of the display target area 531 located on the upper left side and the background of the display target area 532 located on the upper right side in the individual-image arranging area 530 of each PC 200 change in color from white to gray, and the icon background images of the icons of CPA and CPB are changed in color from white to gray. Since the cursor image 590 operates independently in each PC 200, as illustrated in FIG. 11, even when the PC 200-1 moves the cursor image 590, the cursor image 590 is not moved in other PCs 200-2 to 200-4.

At the time point t10, in a case where the participant operating CPA performs drag-and-drop of the mark images of CPB and CPC to the icon arranging area 540 in the configuration change image 500 displayed in the PC 200-1, the projector 100 changes the color of a portion in which the image C is located to white and projects an entire image 20 including the image D. In addition, in this case, the mark images disappear from the display target area 532 located on the upper right side and the display target area 533 located on the lower left side in the individual-image arranging area 530 of each PC 200, and the icon background images of the icons of CPB and CPC disappear as well. In addition, the mark image disappears from the original place in accordance with the movement or the drag-and-drop, and a depressed image 580 is displayed in the display target area in which the mark image disappears.

At the time point t11, in a case where the participant operating CPA performs drag-and-drop of the mark image of CPA located on the upper left side to the display target area 533 located on the lower left side in the configuration change image 500 displayed in the PC 200-1, the projector 100 projects an entire image 20 including the images A and D. In addition, in this case, the icon background image of the icon of the CPA changes in color from gray to white in the icon arranging area 540 of each PC 200.

At the time point t12, in a case where the participant operating CPA double clicks on the icon of CPB in the state in which the mouse cursor overlaps the icon of CPB in the configuration change image 500 displayed in the PC 200-1, the mark image of CPB is displayed in the display target area 531 located on the upper left side that has a highest priority level out of vacant areas in which a mark image is not arranged among the display target areas 531 to 534, and a gray icon background image is added to the icon of CPB. In addition, in a case where an icon within the icon arranging area 540 that can be selected is double-clicked in the state in which there is no vacant area in the individual-image arranging area 530, a mark image having the lowest priority level that is present in the display target area 534 located on the lower right side disappears, and a mark image corresponding to the double-clicked icon is displayed in the display target area 534. In addition, not only first operation information according to a general drag-and-drop operation but also second operation information according to the double click operation is input to the input unit 260, and accordingly, the terminal-side image generating unit 230 can generate the configuration change image 500 based on not only the first operation information but also the second operation information. In addition, the second operation information can be input by using a keyboard connected to the PC 200-1 as well. For example, it may be configured such that, by selecting an icon within the icon arranging area 540 through a TAB key of the keyboard that is input by the participant, the corresponding icon is highlighted, and the mark image corresponding to the icon selected through the input of the Enter key of the keyboard is displayed in the individual-image arranging area 530. In this case, it is not necessary for the mouse cursor to overlap a desired icon. In such a case, since an icon can be selected through a simple keyboard operation, a user who is not acquainted with the operation of a pointing device can easily change the configuration of the entire image.

As above, according to this embodiment, the PC 200 generates an image representing the icon 550 of the own terminal device in a form different from those of the icons 552 to 556 of other terminal devices in the icon arranging area 540, a user can easily operate the icon 550 of the own terminal device of which the frequency of the operation is higher than those of the icons 552 to 556 of other terminal devices. Accordingly, in a case where an entire image 20 including individual images that are based on the image information transmitted from the PC 200 is displayed by the projector 100, the operation for changing the configuration of the entire image 20 can be easily performed. Therefore, even in a case where the configuration of the entire image 20 is changed by using the PC 200 of each participant, the participant can efficiently perform a desired operation.

In addition, according to this embodiment, the PC 200 displays the icon 550 and the mark image 570 of the own terminal device to be larger than the icons 552 to 556 and the mark images 572 and 574 of other terminal devices, whereby the user can easily operate the icon or the like of the own terminal device of which the frequency of the operation is higher than those of the icons or the like of other terminal devices. Furthermore, according to this embodiment, the PC 200 displays a depressed image 580 in a depressed state in the display target area 534 in which the mark images 570 to 574 are not arranged, whereby the user can perform a drag-and-drop operation more easily than a case where an image in a flat state is displayed in the display target area 534 and can easily acquire the movement destinations of the icons 550 to 556. In addition, according to this embodiment, the PC 200 fixes the display position of the icon 550 of the own terminal device, whereby the user can operate the icon of the own terminal device of which the frequency of the operation is higher than those of the icons 552 to 556 of the other terminal device.

Furthermore, according to this embodiment, the PC 200 generates the configuration change image 500 that includes the individual-image arranging area 530 that represents the arrangement of the individual images 30 to 33 in the entire image 20 displayed by the projector 100, whereby the configuration of the entire image 20 can be presented in an easy manner. In addition, according to this embodiment, by displaying the icon arranging area 540 by using the PC 200 in which an identification name (a host name or the like) is displayed together with an icon imitating the participant so as to be included in the configuration change image 500, and accordingly, each participant can check the current participants, so that the participants can be easily checked even in a conference between remote places or the like. Furthermore, according to this embodiment, the PC 200 changes the display state of the individual-image arranging area 530 in accordance with an operation, and accordingly, even in a case where the configuration of the entire image 20 is changed, such a change can be reflected on the display of the individual-image arranging area 530 in a speedy manner. In addition, according to this embodiment, the PC 200 changes the icon background images present on the backgrounds of the icons as operation targets in accordance with the display state of the individual-image arranging area 530, the user can visually check the display state in an easy manner and can perform an operation in a speedy manner.

In addition, according to this embodiment, the PC 200 changes the icon background images in accordance with the assignment states of mark images or the like, whereby the user can easily perform an operation at the time of performing an operation relating to the icons in accordance with the display state. Furthermore, according to this embodiment, the PC 200 changes the icon background image to three different states in accordance with three display states, whereby the user easily performs an operation relating to the icon in accordance with the display state. In addition, according to this embodiment, the PC 200 determines whether or not an individual image is displayed based on the operation information that represents the position of the cursor image 590 and the operation information that represents the press-down operation of the display button images 520 to 524, whereby the user can change the display of the individual image through various operations and can change the configuration of the entire image 20 in a speedy manner.

Furthermore, according to this embodiment, the PC 200 also responds to a double-click operation other than the drag-and-drop operation, whereby the operation for changing the configuration of the entire image 20 can be easily performed in a case where the entire image 20 including the individual images 30 to 33 on the basis of the image information transmitted from the PC 200 is displayed by the projector 100. For example, since an operation in a mobile information terminal or the like is performed using a touch panel or the like, it may be difficult and take time to perform the drag-and-drop operation. However, according to this embodiment, the user can change the configuration of the entire image 20 through a double-click operation (continuous touch operations), and accordingly, the user can comfortably perform a desired operation even in a case where a mobile information terminal or the like is used. In addition, according to this embodiment, the PC 200 can arrange the mark image in accordance with a double-click operation in the state in which the mouse pointer overlaps the icon, and accordingly, a mark image can be automatically arranged in a vacant area.

In addition, according to this embodiment, the projector 100 displays an individual image based on the image information transmitted from the PC 200 that has transmitted the participation request information first regardless of an explicit display instruction, does not display an individual image on the basis of the image information transmitted from the PC 200 that has transmitted the participation request information second or later in the state in which there is no explicit display instruction but displays the individual image in a case where there is an explicit display instruction. Accordingly, even in a case where participation requests or the like are received from a plurality of the PCs 200, the entire image can be appropriately displayed in a speedy manner. In addition, in a case where the display device displays an individual image on the basis of the image information transmitted from the PC 200 that has transmitted the participation request information second or later, the existing previous configuration of the entire image is changed so as to interfere with a presentation or the like. However, according to this embodiment, the projector 100 can accept a participation request or the like from the second or later PC 200 without changing the existing configuration of the entire image. On the other hand, for example, in a case where the display device does not display individual images that are based on the image information transmitted from all the PCs 200 that have transmitted the participation request information, the PC 200 that has issued the first participation request needs to issue an explicit display instruction all the time, thereby degrading the convenience. However, according to this embodiment, the projector 100 can instantly display an individual image that is based on the image information transmitted from the PC 200 that has transmitted the participation request information first, thereby improving the convenience.

Furthermore, according to this embodiment, the projector 100 generates the entire image 20 based on the configuration change request information transmitted from the PC 200, whereby the entire image 20 can be appropriately displayed. In addition, according to this embodiment, the projector 100 uses the image configuration data 144 and the like, whereby the entire image 20 can be appropriately displayed. Furthermore, according to this embodiment, the projector 100 can notify each PC 200 of the configuration of the entire image 20 and the participating PCs 200, whereby the PC 200 can generate the configuration change image 500 on which the latest state is reflected.

In addition, according to this embodiment, the PC 200 uses the image configuration data 244 and the like, whereby the configuration change image 500 on which the latest state is reflected can be generated. Furthermore, according to this embodiment, the PC 200 transmits the configuration change request information in accordance with an operation relating to the change in the configuration to the projector 100, whereby the projector 100 can change the configuration of the entire image 20 in accordance with the operation relating to the change in the configuration.

OTHER EMBODIMENTS

Figure 12:
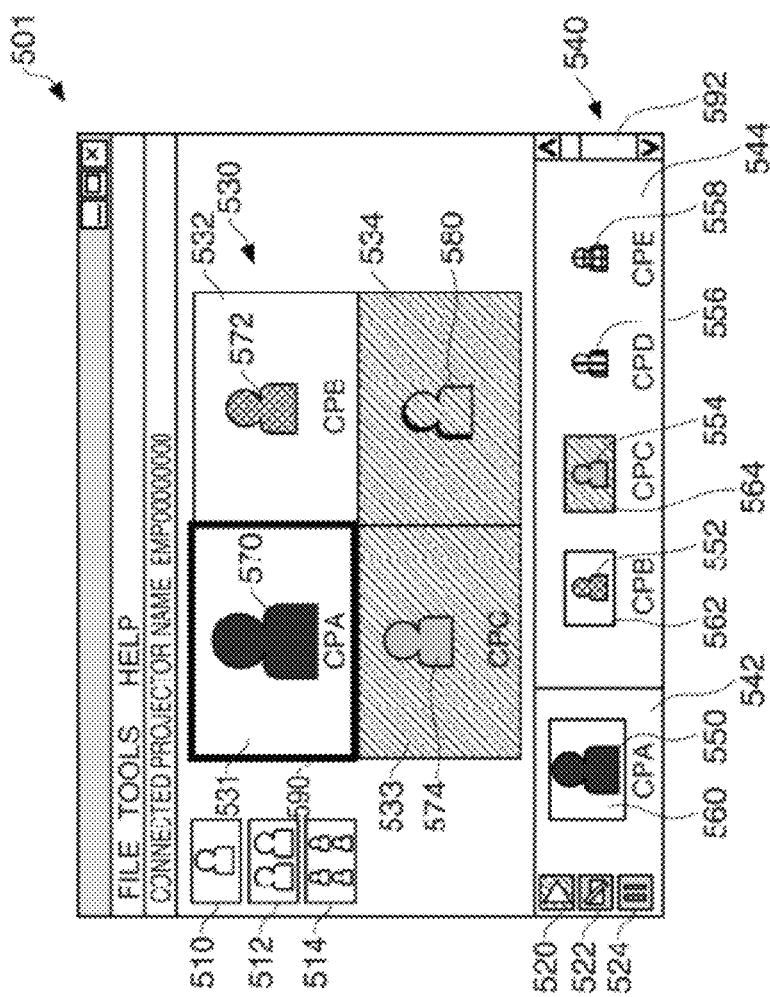
FIG. 12 is a diagram illustrating an example of a configuration change image according to other embodiments.

The application of the embodiment of the invention is not limited to the above-described embodiment, and any modification can be made therein. For example, the number of the PCs 200 is not limited to four but may be three or less or five or more. In addition, the number of the projectors 100 may be two or more. FIG. 12 is a diagram illustrating an example of a configuration change image 501 according to other embodiments. For example, the configuration change image 501 may be generated such that, in a case where the number of the PCs 200 participating in a conference is six or more, and the icons 558 of only up to five CPEs can be displayed in the other-device area 544, the terminal-side image generating unit 230 adds a scrollbar image 592 in the other-device area 544, and the icons of the sixth PC 200 and the PC 200 after that are displayed in the other-device area 544 through scrolling the scrollbar image 592.

In addition, in the above-described embodiment, although the terminal-side image generating unit 230 changes the form of the icon background image in accordance with the display state of the individual-image arranging area 530, the form of the icon may be changed. Furthermore, the change in the form is not limited to a change in the color and may include, for example, a change in the pattern, a change in the shape, and a change in the emphasis effect through blinking or the like.

In addition, the operation other than the drag-and-drop operation, which corresponds to the second operation information, is not limited to the double-click operation and, for example, may be an operation through the selection of an item from a menu displayed by clicking the right button of the mouse, an operation of a key of the keyboard, a contact operation for a touch panel of a mobile information terminal or the like, or the like. For example, the terminal-side update unit 250 or the terminal-side information generating unit 220 may determine a display target area in the individual-image arranging area 530 that is instructed by the user in accordance with a change in the contact position (for example, the movement direction, the movement direction and the movement speed, the movement direction and the movement amount, or the like) on a touch panel or the like, based on the information transmitted from the input unit 260. For example, the terminal-side update unit 250 may determine that a display target area 531 located on the upper left side is instructed in a case where the user moves the icon 550 to the left side at a speed equal to or higher than a reference value (or a movement amount equal to or higher than a reference value) in the state shown in FIG. 8. On the other hand, in a case where the user moves the icon 550 to the left side at a speed lower than a reference value (or a movement amount less than a reference value), the terminal-side update unit 250 may determine that the user instructs the display target area 533 located on the lower left side. In addition, the technique for determining the display target area in accordance with the second operation information is not limited to the above-described technique utilizing the priority level described above and, for example, may be a technique for a random determination, a technique for determining a display target area that is closest to the double-clicked icon, a technique for determining a display target area located at the position of the cursor image 590, a technique for determining the display target area in accordance with the change in the contact position described above, or the like.

In addition, the search image 400 and the configuration change image 500 may be images (for example, OSD images or the like) generated in a layer other than the layer of a graph image that is the source of the image information and the like or may be images that are captured together with the graph image and the like. Even in a case where the configuration change image 500 and the like are captured together with the graph image and the like through the specification of the OS or the like, the user can configure the display of the configuration change image 500 and the like in the entire image 20 to be visually undistinguished by displaying the configuration change image 500 and the like in a minimized form or displaying the configuration change image 500 and the like to be stepped aside to the right end in a form protruding from the screen of the PC 200. Particularly, in the configuration change image 500, button images for the operation are concentrated to the left side, and accordingly, even in a case where the configuration change image 500 is moved to the right side so as to protrude from the screen, the button images for the operation can be operated by the user.

In addition, as described above, each user can operate the icons or the like of other PCs 200 in the configuration change image 500 or 501 by using his or her own PC 200, and thus the users may simultaneously perform different operations. For example, in a case where conflicting operations are performed, the projector 100 can give priority to an operation that is accepted first or an operation that has been accepted last by using a reception number or the like.

In addition, it may be configured such that the terminal-side communication unit 210 transmits not only the image information but also audio information representing a remark or the like of a participant to the projector 100, and an audio output unit included in the projector 100 outputs audio that is based on the audio information.

In addition, the connection form between the projector 100 and the PC 200 is not limited to the wireless connection shown in FIG. 1 and, for example, may be a wired connection through a LAN or the like. Furthermore, the display device is not limited to the projector 100 and, for example, may be a television set, a liquid crystal monitor, an electronic device (for example, a digital camera, a cellular phone, or the like) provided with a projection function, or the like. In addition, the terminal device is not limited to the PC 200 and, for example, may be a cellular phone, a mobile information terminal, or the like.

Furthermore, the computer included in the projector 100 may serve as the display-side image generating unit 130 that reads out a program stored on an information storage medium or the like. As such an information storage medium, for example, a CD-ROM, a DVD-ROM, a ROM, a RAM, an HDD, or the like can be used.

In addition, the projector 100 is not limited to the liquid crystal projector (a projection type or a reflection type such as an LCOS) and, for example, may be a projector that uses a digital micro-mirror device or the like. In addition, the projection unit 190 may employ a self luminescence device including a solid-state light source such as an organic EL device, a silicon light emitting device, a laser diode, or an LED, instead of a lamp. Furthermore, the function of the projector 100 may be divided into a plurality of devices (for example, a PC and a projector or the like).

What is claimed is:

1. At least one non-transitory information storage medium which stores a program that is readable by a computer included in each of a plurality of terminal devices,
   wherein the program allows the computer in each of the plurality of terminal devices to perform:
   generating a configuration change image used for changing a configuration of an entire image which includes individual images on the basis of image information supplied from each of the plurality of terminal devices, wherein the configuration change image includes an individual image arranging area that is divided into a plurality of display target areas and an icon arranging area including a plurality of icons each corresponding to one of the plurality of terminal devices, the individual image arranging area representing an arrangement of the individual images in the entire image displayed by a display device;
   altering the configuration change image by inputting operation information such that a mark image corresponding to at least one of the plurality of icons is arranged in at least one of the display target areas, wherein the individual images displayed in the entire image correspond to the arrangement of the mark images in the display target areas;

generating and transmitting image information to the display device when transmission start request information is received by the plurality of terminal devices from the display device; and stopping generating and transmitting image information when transmission stop request information is received by the plurality of terminal devices from the display device, and wherein the operation information includes:
  a first operation information which corresponds to a drag-and-drop operation of the at least one of the plurality of icons from the icon arranging area to the at least one of the display target areas, and
  a second operation information which corresponds to an operation other than the drag-and-drop operation.

2. The information storage medium according to claim 1, wherein the second operation information is information according to an operation performed in a state in which the at least one of the plurality of icons is set as an operation target so as to be displayed in a highlighted mode.

3. The information storage medium according to claim 1, wherein the second operation information is information according to an operation performed in a state in which a mouse pointer overlaps the at least one of the plurality of icons.

4. The information storage medium according to claim 3, wherein the second operation information is information according to a double-click operation performed in the state in which the mouse pointer overlaps the at least one of the plurality of icons.

5. The information storage medium according to claim 1, wherein the program allows the computer in each of the plurality of terminal devices to arrange the mark image corresponding to the at least one of the plurality of icons represented in the second operation information based on the second operation information in a vacant display target area in a case where there is the vacant display target area in which the mark image is not arranged and arrange the mark image in the display target area having a lowest priority level in a case where there is no vacant display target area.

6. A plurality of terminal devices each comprising:
  an image generating unit that generates a configuration change image used for changing a configuration of an entire image displayed by a display device which includes individual images on the basis of image information supplied individually from each of a plurality of terminal devices; and
  an input unit to which operation information representing an operation relating to a change in the configuration is input;
  an information generating unit that generates the image information representing an image; and
  a communication unit that transmits the image information to the display device,
  wherein:
    the configuration change image includes an individual-image arranging area divided into a plurality of display target areas and an icon arranging area including a plurality of icons each corresponding to one of the plurality of terminal devices, the individual image arranging area representing an arrangement of the individual images in the entire image,
    the image generating unit alters the configuration change image by inputting operation information such that a mark image corresponding to at least one of the plurality of icons is arranged in at least one of the display target areas, wherein the individual images displayed in the entire image correspond to the arrangement of the mark images in the display target areas,
    the information generating unit generates the image information and the communication unit transmits the image information to the display device when transmission start request information is received by the plurality of terminal devices from the display device, and
    the information generating unit stops generating the image information and the communication unit stops transmitting the image information when transmission stop request information is received by the plurality of terminal devices from the display device, and
  wherein the operation information includes:
    a first operation information which corresponds to a drag-and-drop operation of the at least one of the plurality of icons from the icon arranging area to the at least one of the display target areas, and
    a second operation information which corresponds to an operation other than the drag-and-drop operation.

7. A display system comprising:
the plurality of terminal devices according to claim 6; and the display device,
wherein the display device includes:
  a reception unit that receives the image information individually from each of the plurality of terminal devices;
  a display-side image generating unit that generates the entire image based on the image information; and
  a display-side display unit that displays the entire image.

8. A method of generating an image comprising:
generating a configuration change image, by a plurality of terminal devices, used for changing a configuration of an entire image displayed by a display device which includes individual images on the basis of image information supplied individually from each of the plurality of terminal devices, the configuration change image includes an individual-image arranging area divided into a plurality of display target areas and an icon arranging area including a plurality of icons each corresponding to one of the plurality of terminal devices, the individual image arranging area representing an arrangement of the individual images in the entire image, and
altering the configuration change image, by inputting operation information by at least one of the plurality of terminal devices, such that a mark image corresponding to at least one of the plurality of icons is arranged in at least one of the display target areas, wherein the individual images displayed in the entire image correspond to the arrangement of the mark images in the display target areas,
generating and transmitting image information to the display device when transmission start request information is received by the plurality of terminal devices from the display device; and
stopping generating and transmitting image information when transmission stop request information is received by the plurality of terminal devices from the display device,
wherein the operation information includes:
  a first operation information which corresponds to a drag-and-drop operation of the at least one of the plurality of icons from the icon arranging area to the at least one of the display target areas, and
  a second operation information which corresponds to an operation other than the drag-and-drop operation.

9. The at least one non-transitory information storage medium according to claim 1, wherein the configuration change image is altered to change the configuration of the entire image displayed by the display device such that the entire image is made up of a plurality of individual images.

10. The at least one non-transitory information storage medium according to claim 1, wherein the configuration change image is alterable for changing the number of individual images configuring the entire image displayed by the display device.

11. The at least one non-transitory information storage medium according to claim 1, wherein the icon arranging area includes another device area where the plurality of icons associated with other terminal devices of the plurality of terminal devices are arranged in the order of connection with the display device, and an own device area where an icon associated with an own terminal device of the plurality of terminal devices is fixedly arranged regardless of the order of connection to the display device.

12. The at least one non-transitory information storage medium according to claim 11, wherein the icon associated with the own terminal device is displayed to be larger than the at least one icon of the plurality of icons associated with the other terminal devices, and the mark image of the own terminal device is displayed to be larger than the mark images of the other terminal devices.

\* \* \* \* \*